(12) United States Patent
Lei et al.

(10) Patent No.: US 12,037,021 B2
(45) Date of Patent: Jul. 16, 2024

(54) ELECTRIC AUTONOMOUS VEHICLE RIDE SERVICE ASSISTANCE

(71) Applicant: FORD GLOBAL TECHNOLOGIES, LLC, Dearborn, MI (US)

(72) Inventors: Oliver Lei, Windsor (CA); Arpita Chand, Dearborn, MI (US); Somak Datta Gupta, Novi, MI (US); Vladyslav Slyusar, Northville, MI (US); Jayanthi Rao, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 17/499,190

(22) Filed: Oct. 12, 2021

(65) Prior Publication Data
US 2023/0110300 A1   Apr. 13, 2023

(51) Int. Cl.
| | | |
|---|---|---|
| *B60L 53/00* | (2019.01) | |
| *B60L 53/36* | (2019.01) | |
| *B60W 50/035* | (2012.01) | |
| *B60W 60/00* | (2020.01) | |

(52) U.S. Cl.
CPC ......... *B60W 60/0023* (2020.02); *B60L 53/36* (2019.02); *B60W 50/035* (2013.01); *B60W 2510/244* (2013.01); *B60W 2556/65* (2020.02)

(58) Field of Classification Search
CPC .......... B60W 60/0023; B60W 50/035; B60W 2556/65; B60W 2510/244; B60L 53/36
USPC .......................................................... 701/25
See application file for complete search history.

(56) References Cited

U.S. PATENT DOCUMENTS

| | | | |
|---|---|---|---|
| 9,231,998 B2 | 1/2016 | Lu et al. | |
| 9,547,309 B2 | 1/2017 | Ross et al. | |
| 10,753,754 B2 | 8/2020 | Delizio | |
| 2016/0129793 A1* | 5/2016 | Cronie | H02J 50/90 320/109 |
| 2019/0210479 A1* | 7/2019 | Bachmann | B60L 53/665 |
| 2019/0219411 A1 | 7/2019 | Christen et al. | |
| 2020/0094823 A1 | 3/2020 | Park | |
| 2020/0094827 A1 | 3/2020 | Park | |
| 2020/0160478 A1 | 5/2020 | Ramot et al. | |
| 2021/0010817 A1 | 1/2021 | Wu et al. | |

* cited by examiner

*Primary Examiner* — Tiffany P Ohman
(74) *Attorney, Agent, or Firm* — Joseph Zane; Brooks Kushman P.C.

(57) ABSTRACT

An autonomous vehicle may determine that it has an amount of power remaining projected to be needed to reach a recharging point by autonomously traveling with predefined systems disabled. The vehicle may disable the predefined systems and travel towards the recharging point. Subsequent to the disabling, the autonomous vehicle may determine that it no longer has the amount of power remaining projected to be needed to reach the recharging point. The vehicle may then communicate with a server and request assistance. The vehicle may then travel to an instructed rendezvous point with a second autonomous vehicle, the rendezvous received from the server. The two vehicles may then communicate to allow the first vehicle to leverage a capability of the second autonomous vehicle, responsive to the first and second autonomous vehicles being within communication range, allowing the first vehicle to reach the recharging point via the leveraging.

19 Claims, 3 Drawing Sheets

ELECTRIC AUTONOMOUS VEHICLE RIDE SERVICE ASSISTANCE

TECHNICAL FIELD

The illustrative embodiments relate to electric autonomous vehicle ride service assistance.

BACKGROUND

Battery electric vehicles (BEVs) are emerging as a preferred source of transportation for the future, especially with regards to autonomous vehicles. They have the potential, through onboard batteries, to store a large amount of energy usable by both the computing systems and the vehicle itself, for powering travel. In limited circumstances, however, the fact that the onboard computers and sensors draw from the same power source as the vehicle can present an issue, when power reserves are low and the vehicle is not proximate to a refueling point.

BEVs and/or battery electric autonomous vehicles (BEAVs) experience significant travel ranges on their internal power supply. The only possible shortcoming is that, unlike gasoline, electricity tends to be less of a portable refueling option. Accordingly, it is best if a BEV remains at a certain threshold of power to ensure that it is not stranded away from a recharging point. While less of a problem in densely populated areas, where recharging may be more available, there are still long stretches of country where there is limited-to-no recharging available. When the BEV is a BEAV, the onboard computing resources that drive the vehicle can also use significant power, which may diminish the range. So, for example, if a person is traveling from one major city to another, across a long stretch of relatively uninhabited terrain, planning must be made to ensure that the computing resources plus the travel do not strand the vehicle in a place where it may be very difficult to obtain additional power.

These vehicles, within an on-demand fleet, may also be repurposed based on demographics of travel, requiring repositioning about a wide geographic locality throughout the course of a day or week, based on where they may be needed. Even absent a passenger, however, a fleet owner would not want the vehicle to become stranded. Since repowering may not instantly be available every time a vehicle must relocate or travel a long distance, vehicles may be tasked with achieving a destination that is pushing a threshold of their range. Any unexpected delays or detours can then cause the vehicle to exhaust a power supply. If a recharging point is proximate to a route when this occurs, the vehicle can re-route. But if no such station is present, it may not be possible for the vehicle to self-navigate to a further-away station. And, if a competent driver is not present, the vehicle cannot also be manually driven, so it cannot simply disable the autonomous feature in order to preserve power while a person drives the vehicle to the further refueling point.

SUMMARY

In a first illustrative example, a system includes a processor configured to receive a request for travel assistance from a first autonomous vehicle, indicating a low power state of the first autonomous vehicle. The processor is also configured to determine a recharging point for use by the first autonomous vehicle. The processor is further configured to determine power required for the first autonomous vehicle to reach the recharging point, under one or more power preservation states enactable by the first autonomous vehicle and, for at least one of the power preservation states, determine a second autonomous vehicle that can provide assistance to the first autonomous vehicle in a manner predefined for the at least one power preservation state and that allows the first autonomous vehicle to reach the recharging point. The processor is additionally configured to instruct the second autonomous vehicle to rendezvous with the first autonomous vehicle at a determined rendezvous point.

In a second illustrative embodiment, a first autonomous vehicle includes a processor configured to determine that a present power level is less than a projected power level needed to reach a recharging point. The processor is also configured to request assistance from a remote server. Further, the processor is configured to, responsive to the request, receive rendezvous instructions, including a rendezvous point for a second autonomous vehicle and execute travel to the rendezvous point. The processor is configured to communicate directly with the second autonomous vehicle when both the first and second autonomous vehicle are within communicable range of each other and offload at least one of computing or sensing tasks to the second autonomous vehicle, wherein the second autonomous vehicle provides a response to the offloaded task allowing the first autonomous vehicle to continue autonomous travel utilizing the response. Additionally, the processor is configured to continue to: offload at least one of computing or sensing tasks to the second autonomous vehicle; receive responses to the offloaded tasks; and autonomously travel utilizing the responses, until the first autonomous vehicle reaches at least one of the recharging point or a location proximate to the recharging point where the first autonomous vehicle projects that the present power level is more than the projected power level needed to reach the recharging point.

In a third illustrative embodiment, a method includes determining, onboard a first autonomous vehicle, that the first autonomous vehicle has an amount of power remaining projected to be needed to reach a recharging point by traveling with one or more predefined systems disabled that still permits autonomous travel. The method also includes disabling the predefined systems and traveling towards the recharging point. Further, the method includes determining, subsequent to the disabling, that the first autonomous vehicle no longer has the amount of power remaining projected to be needed to reach the recharging point, re-projected from a present location of the first autonomous vehicle. The method additionally includes communicating with a server and requesting assistance, responsive to the first autonomous vehicle no longer having the amount of power remaining. Further, the method includes receiving rendezvous instructions including a rendezvous location for meeting a second autonomous vehicle, responsive to the requesting. And the method includes leveraging, at the first autonomous vehicle, a capability of the second autonomous vehicle, responsive to the first and second autonomous vehicles being within communication range, allowing the first vehicle to reach the recharging point via the leveraging.

DETAILED DESCRIPTION

Figure 1:
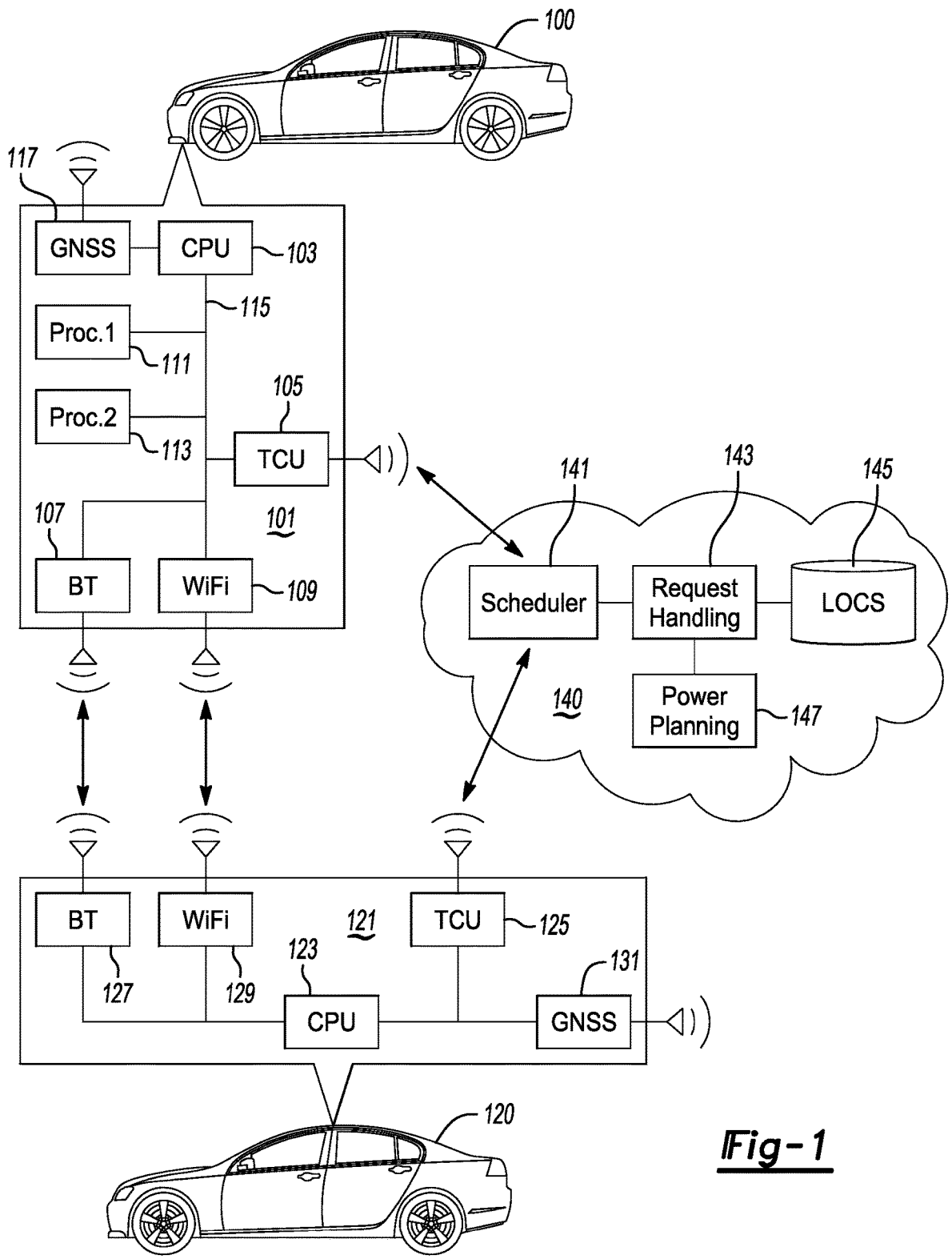
FIG. 1 shows an illustrative example of a multi-vehicle BEAV fleet management system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Because vehicles may run out of power when traveling long distances away from available recharging, it is useful to have options for preventing complete power loss. When the electric vehicle is a BEAV, it may be unoccupied, or may lack a competent driver (underage or unlicensed passenger), and so a simple solution of powering down the autonomous functions and allowing a passenger to drive to a designated recharging point may not be possible. At the same time, the vehicle cannot typically self-drive without sensor guidance and computing, and so absent a tow-truck, there may be limited options when a vehicle unexpectedly runs low on power.

Careful planning can avoid a lot of these situations, but traffic delays, unexpected battery life reduction, unexpected detours, etc., may still result in situations where a vehicle lacks sufficient power to self-drive to a recharging point, requiring more than the amount of power remaining to both power the vehicle and perform the necessary sensing and computation.

It is likely that all vehicles will not be able to be charged constantly, and so there may necessarily be vehicles on the road in medium or low power states. Passengers may also reroute vehicles in unexpected manners, and the terms of a travel contract may limit the vehicle's ability to recharge while an occupant is present, since the recharging typically takes a reasonably long (relative to the travel time) duration.

One proposed solution concept, shown in illustrative example via the embodiments herein, allows for a second vehicle, having higher power, to assist the BEAV in reaching a destination. While it may not always be possible to predict a vehicle will run too low on power at the start of a journey, current power reserves are a known commodity, and it may be more reasonable to know when a vehicle is likely to run out of power or reach a critical power state prior to reaching a recharging point. That is, once a journey is underway, the effects of unexpected delays and detours will be observed and the likely amount of power needed to complete a journey from any point is determinable. The variability of this number may diminish as a vehicle approaches a destination, which may have the positive effect of a more accurate prediction, but which may also reveal that an original prediction was incorrect in a manner that may leave the vehicle stranded.

As the likelihood of such an occurrence increases (e.g., as the vehicle continues travel, but power usage is beyond what was expected and limited reserves appear to remain), a central management system can take mitigating actions to avoid a complete loss of power while the vehicle is still traveling. In this example, that includes tasking another vehicle to provide assistance to the BEAV to guide it to a destination, by leading the ailing vehicle and serving as a guide, which can include distributed sensing and computing (where the leading vehicle senses and computes for the trailing vehicle) and/or having the trailing vehicle shadow the lead vehicle in some manner (effectively acting in a manner similar to one vehicle towing another on a trailer) with sensing and computing processes off to save power.

In the former example, some amount of sensing and compute can be offloaded onto the lead vehicle and the lead vehicle can use excess power to perform sensing and compute processes for the trailing vehicle, sending data back to the trailing vehicle where limited autonomous driving can be performed under the guidance of the lead vehicle. In the latter example, the trailing vehicle may closely follow the lead vehicle, which may act in a manner that avoids breaking the two vehicles apart (e.g., minimizing lane changes, acceleration, etc.). Since both vehicles may be autonomous, the trailing vehicle can be informed of all decisions prior to the lead vehicle enacting the next move, so it can anticipate the movement of the lead vehicle, which should limit the likelihood of the vehicles becoming separated.

It may also be possible for autonomous vehicles to drive much more closely together than would be advised for manually driven vehicles, because of the ability to anticipate the other vehicles actions and because of the reaction time of computers. Thus, the vehicles may be able to act in near-concert and move closely enough together to avoid any intervening vehicle interference. The lead vehicle, knowing that it is functioning in either mode (or another similar guidance mode), can make decisions that accommodate the situation, limiting movement that may be likely to break the group apart (e.g., limiting lane changes, being careful at lights not to break the group, notifying other crossing vehicles at a stop sign, etc.).

If the vehicles become separated, unless power is at an absolutely critical state, the trailing vehicle can always self-drive back to the lead vehicle, which could have slowed or stopped to await the trailing vehicle. And, in situations like lane changes, full control may be given back to each vehicle, out of caution. But, for the majority of the travel, the lead vehicle should be able to take some computing and/or driving load off of the second vehicle and allow the second vehicle to obtain an increased range by limiting usage of high-power-using computing systems.

FIG. 1 shows an illustrative example of a multi-vehicle BEAV fleet management system. In this example, a vehicle 100 includes an onboard computing system 101, which may include, among other things, a telematics control unit 105 usable for cellular communication. The vehicle 100 may also include BLUETOOTH 107 and Wi-Fi 109 transceivers, usable for communication with respective BLUETOOTH and Wi-Fi devices in proximity to the vehicle 100 and within range of the respective transceivers.

The vehicle 100 may also include a variety of onboard compute processes 111 and 113 or modules, sensors or other power-intensive elements. Memories storing these processes, as well as sensors and/or modules may be connected to the CPU 103 by one or more vehicle busses 115. The vehicle 100 may further include a GNSS receiver 117 such as a GPS receiver.

The particular entire set of elements within the vehicle 100 is not the subject of interest, except to ensure the vehicle is capable of some form of communication with another vehicle 120 and/or the cloud 140. Communication could be provided in a variety of forms, and does not necessarily even need to involve traditional wireless communication. For example, were vehicle 100 provided with a camera and were vehicle 120 provided with rear-facing LED array lights, vehicle 120 could convey information to vehicle 100 by simply changing patterns of a light array, which may be more power efficient for vehicle 100 than using wireless communication to exchange large data packets.

In one embodiment, while sufficient power remains in vehicle 100, a more advanced form of communication may be used, but as power dwindles and a destination has not been reached, the communication may become more simplistic in order to maximize power for driving. Current driving conditions may also be considered—whether the vehicle 100 is close to a refueling point and whether a current road/route is suitable for less-granular control functions (e.g., where the vehicle 100 performs more like a trailer-towed vehicle than an autonomous one). Nonetheless, it is possible to exchange information using a variety of communication mediums that could include light or even sound, again depending on whether conditions permit.

Vehicle 120 is a similar vehicle to 100, although not necessarily the same make and model. If vehicle 120 is to provide sensor information and/or processing for vehicle 100, the cloud 140 may confirm that vehicle 120 is suitable for such tasks (based on systems, configuration and present power state, among other things) prior to dispatch.

Vehicle 120 has onboard computing system 121, which also includes a CPU 123 and a variety of communication transceivers. These can include a TCU 125 for communication with the cloud over cellular, BLUETOOTH 127 and Wi-Fi 129 transceivers, for communication with another vehicle 100 or other local devices. This vehicle 120 may also include a GNSS transceiver 131.

The cloud 140 can include a number of remote processes, such as a scheduler 141. The scheduler may be responsible for communicating dispatch instructions to vehicle 100, 120 and may receive communication pertaining to active jobs from these vehicles (as well as other communication). So, for example, vehicle 100, which may or may not have an occupant onboard, may notify the scheduler that (based on a present onboard evaluation of proximate power sources and a present power state), it is unlikely, or projected below a predefined threshold, that the vehicle 100 will be able to reach a recharge point prior to running out of power.

This information can be passed to a request handling process 143, which can access a power planning process 147 to determine how best to assist the potentially stranded vehicle 100. These are merely exemplary processes showing what sorts of back-end determinations can occur. The power planning process can consider how much power is reported as remaining from vehicle 100, which can be used to determine various likely ranges based on powering down certain systems and/or offboarding certain tasks. For one or more of these reconfigurations, the process can also determine what sort of vehicle (features, power level, proximity, etc.) should be sent to assist.

Certain reconfigurations of 100 may require vehicle 120 to include certain sensors. Others may require certain remote compute functions to be possible in vehicle 120. Still other reconfigurations may require vehicle 120 to have simple communication capability and a certain power reserve. Even if the present location of a given vehicle 120 is not yet known, it is possible to determine the requirements and, for each candidate vehicle meeting the requirements, determine how much power is likely to remain if the vehicle rendezvous with vehicle 100 at one or more rendezvous points. As discussed later, these can include present locations of vehicle 100 or points along a present route of vehicle 100, if vehicle 100 provides sufficient advance notice to the scheduler of a possible stranded state.

The power planning can pass back requirements to the request handler, which can access a database of live or near-live vehicle statistics 145, which can include locations, present power states, present tasks, etc. If vehicles 120 are frequently used for assistance, some number of vehicles 120 may be left untasked for a given locality based on a statistical likelihood that one will be needed. In other examples, the process will find vehicles 120 that are between tasks or which can otherwise exist. Even if a given vehicle 120 has been routed to a user, it may be a suitable candidate for assistance, so it may be rerouted and another available vehicle may be routed to the user in a manner that has little or no impact on the user end-experience (e.g., an alternative pickup vehicle travels 10 minutes while the original pickup vehicle is rerouted to assist, while it was also 10 or more minutes away from the user).

Vehicle 120 can confirm that it has the appropriate capabilities to assist vehicle 100, and can receive a rendezvous location from the scheduler. Vehicle 100 can also be routed to this location, and whichever vehicle 100, 120 arrives first can wait. Even if vehicle 100 includes a passenger, it is likely the passenger will be ok waiting some short period of time while assistance travels to the passenger.

Figure 2:
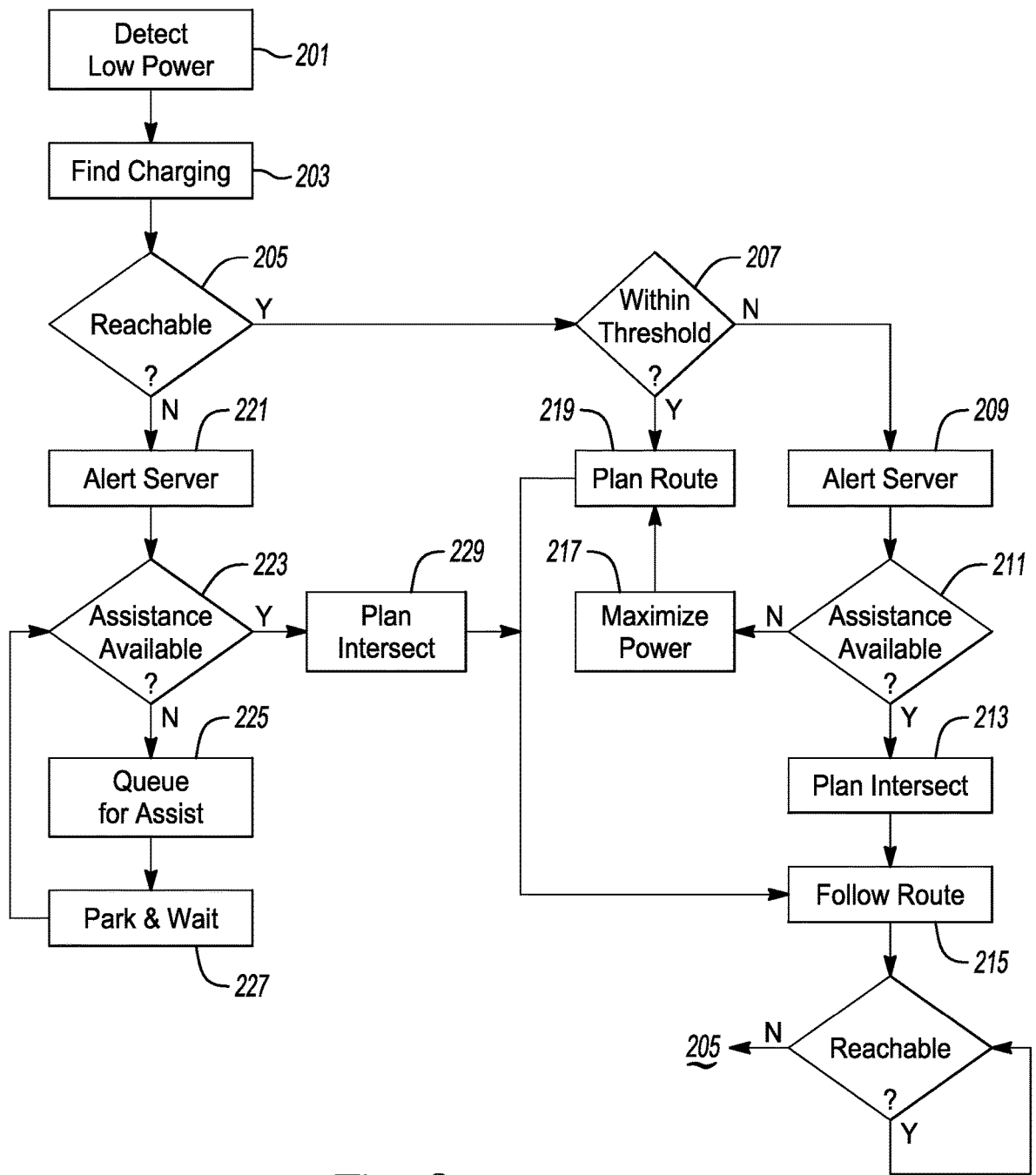
FIG. 2 shows an illustrative process for a vehicle-assist procedure.

FIG. 2 shows an illustrative process for a vehicle-assist procedure. In this example, the process executes on, for example, vehicle 100 and allows the vehicle 100 to determine a low-power state, request assistance, and actively monitor the power state to maximize the likelihood of reaching a recharging point.

At some point in a journey, vehicle 100 determines that it is in a low power state at 201. This can include a user or owner defined threshold, or may be a dynamic threshold tied to a presently maintained awareness of the likely amount of power needed to reach a recharging point. In the latter example, the vehicle 100 can continually determine the likely amount of power needed for a next reachable recharging point (or the same point that is conveniently located, e.g., not the closest, but in the right direction). Presumably, when a journey began, the vehicle 100 had enough power or was supposed to have enough power to reach this point, but along the way, the power situation may have materially changed. Alternatively, a planned recharge may have been shut-down by a power outage, requiring the vehicle 100 to travel further, and vehicle 100 can also be apprised of such changes. If the amount of remaining power reaches, for example, without limitation, the power needed to reach the recharge point plus 10 percent (e.g., it includes a buffer), then the vehicle 100 may determine it is in a low power state. The buffer and thresholds can be included and or varied as appropriate.

If the vehicle 100 is not already aware of a charging point, it will find a closest and/or closest convenient (in a correct or semi-correct direction) power point for recharging. For example, the vehicle 100 may have originally simply contemplated the amount of power needed to reach a destination, where known charging existed. If remaining power runs too low to achieve that goal, the vehicle 100 may have to search for local charging. It may first look for reachable convenient recharging, and if not reachable, then it may look for "inconvenient, but reachable" recharging (e.g., backtracking). Since sending an assist vehicle 120 may require using two vehicles for a substantial period of time, it may be advisable to attempt to find even an inconvenient, but reachable, point, for vehicle 100. On the other hand, a subscription model (if occupants subscribe to tiered ride-sharing models) or even the mere fact of an occupant may make it more reasonable to keep vehicle 100 along its present route and simply send an assist vehicle 120 to rendezvous so that the occupied vehicle does not backtrack.

If the vehicle 100 finds a charging point that is reachable at 205 and is within a tolerance threshold at 207, the vehicle 100 may simply plan a route at 219 without contacting the server initially. That is, if the vehicle 100 determines that present power is equal to power to reach recharging+3* a "low" threshold (e.g., 10%), then there is probably no need for assistance and the vehicle 100 can continue to recharging under its own power.

If the point is not within the threshold, for example, present power is equal to power to reach recharging+0.5* the low threshold, then assistance may need to be scheduled at 207. In the first example, the power is 130% of what is projected to be needed, with a threshold of 10% (e.g., 110% is the cutoff). In the second example, power remaining is only 105% of what is needed, and so assistance may (but not necessarily) be required.

If below the cutoff threshold, the vehicle 100 alerts the server at 209 and determines if assistance is available at 211, as indicated by the server in response to the alert. For various reasons, e.g., assist vehicles are given priority to occupied assist-needing or really low (<100% required) power assist-needing vehicles, there may not be an available assist vehicle. For example, a given locality may have 3 assist needing vehicles and one assist vehicle available. It may first assist one of the 3 vehicles having a passenger, giving that vehicle priority based on the passenger presence over the other two vehicles. The next priority of the other two vehicles may be a vehicle with a <100% power state, where the vehicle projectedly lacks even sufficient power to reach recharging. If both vehicles have sufficient projected power, then it is possible that the assist vehicle just assists a more conveniently located of the two, or whichever of the two has the lowest projected power relative to needed power (e.g., 102% vs. 104%).

If the assist vehicle 120 is not available, the vehicle 100 may attempt to maximize power at 217 and plan a route to the recharging point at 219. The vehicle 100 may also maximize power at 207 when the vehicle 100 is within the threshold (e.g., 130%), but since maximizing power may include first disabling things like HVAC and then disabling non-critical sensors, onboard internet hotspots, etc., the user may prefer that the maximization algorithm not engage unless the power is at a sub-threshold state (<110% in this example).

The vehicle 100 also continually monitors itself during travel to the recharging point, so if the 130% of need ever becomes <110% of remaining need, the next-step can be taken (e.g., contacting the server, maximizing power, etc.). Similarly, if what was 105% of need falls below 100% of need (e.g., the vehicle 100 can no longer reach the station under maximized power mode), the process can branch to unreachable at 205. If the vehicle 100 has reached out for assistance or possible assistance at 209, and the assistance is available at 211, the vehicle 100 may receive rendezvous points and will plan an intersect with the vehicle 120 at 213. In all instances, the vehicle 100 may continue to follow a route plan and continually check for reachability at 231, branching to unreachable at 205 if the projected situation changes to a more dire one.

If, at any time, the recharging point appears to be unreachable based on present power compared to projected power needed to reach the point (which may accommodate a maximum power mode, wherein all non-essential systems are disabled temporarily), the vehicle 100 may alert the server at 221.

The server may respond with the availability of assistance at 223, which may involve informing the vehicle 100 that vehicle 120 can assist and should be met at a location included as a rendezvous point. The vehicle 100 plans a route to that point at 229 and follows the plan 215. If the rendezvous point becomes unreachable at 231, the process can repeat, resetting the rendezvous point closer to vehicle 100, up to and including simply having vehicle 100 stop, park and wait if that is the only way to preserve sufficient power to reach the recharging point, even with assistance from vehicle 120.

If there is no available assistance vehicle 120 at 223, the vehicle 100 may queue for assist (a process that may occur at the server) and then either park and wait at 227 or travel a reasonable distance to a likely rendezvous point. In the latter example, for example, if the vehicle 100 is located on a highway 10 miles from the next exit, but 100 miles from a prior exit, it is highly likely the rendezvous will occur and the next exit, and therefore, absent a dire power state, it is reasonable to have the vehicle 100 travel most or all of the 10 miles to the next exit, even if no particular assistance is known. The park and wait can then occur at the next exit, but this creates an efficiency if the assist vehicle ends up being revealed as being in close proximity to that exit.

Figure 3:
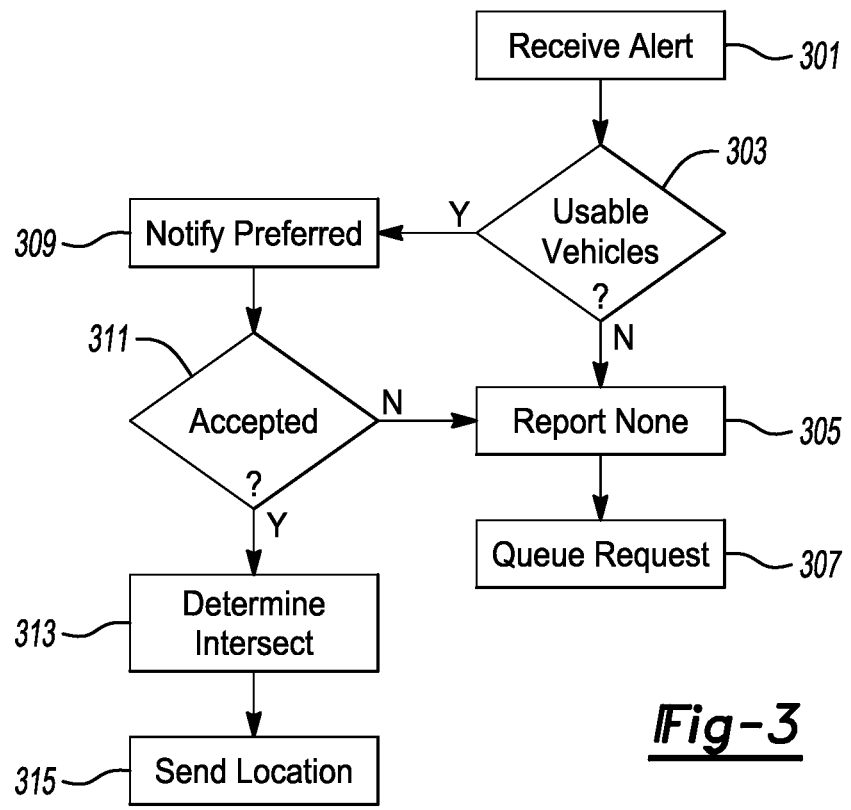
FIG. 3 shows an illustrative alert-handling process.

FIG. 3 shows an illustrative alert-handling process. This is a server-side process where the cloud 140 or a backend server or servers attempts to find an assist vehicle 120 to assist a stranded or potentially strandable vehicle 100. The server receives the alert at 301 and determines if there are usable vehicles 120 within proximity to the request vehicle 100 at 303. This can include, for example, determining the power remaining in vehicle 100 (reported) as well as the power needed to travel to various nearby recharging points under present travel conditions and under varied sensor and system shut-down conditions. Vehicle 100 may further inform the server that it is occupied (which can play into selection of recharging points) and/or vehicle 100 may identify a preferred charging point already identified by vehicle 100.

The server can determine the power needs and/or system needs of an assist vehicle 120 at 303 and determine if any such vehicle 120 is in reachable proximity and will be available, which can include determining if it will still have sufficient power after traveling to any rendezvous point.

If there is no such vehicle 120, the server may ignore one or more vehicle edicts (e.g., preferred recharging) and determine if there is an alternative assist solution that at least results in immediate assistance. If no solution can be found, the server will report that there is no present assistance available at 305. The server may then queue the pending vehicle request at 307.

If there are one or more solutions that reveal a possible assist scenario at 303, the server may contact any identified vehicles 120 at 309. Because the vehicles 120 may not always be able to keep a server apprised of immediate conditions (e.g., power or local traffic), the vehicle 120 may be given an opportunity to reject the request, even when the server is presumably supposed to be in charge of routing the vehicles 100, 120.

The request at 309 may also be conditional, for example, it may include parameters for acceptance, that include, for example, projected time to service the request (given present conditions of only which vehicle 120 may be aware), criticality of request (e.g., if the vehicle 100 is likely to make it to the station and rerouting vehicle 120 may place vehicle 120 in a precarious power state), etc. So, vehicle 120 may confirm that the conditions are all met and then confirm the request, denying it if any conditions are not met.

If the vehicles 120 all reject the request for assistance, the server again reports that no vehicles 120 are available at 305. Otherwise, it may determine a reasonable intersection/rendezvous point at 313. This can accommodate the present location of vehicle 100 as well as any other constraints, such as whether vehicle 100 should or even can keep traveling ("can" in the sense that too much power would be depleted under even limited-function AV travel), what travel times for each vehicle dictate the point with the least waiting by either vehicle, whether vehicle 120 needs to meet vehicle 100 at past a certain point on a vehicle 100 route in order to have sufficient power to assist vehicle 100, etc.

Primary and/or secondary rendezvous points may be determined at 313 and distributed at 315. For example, a primary point could optimize the most variables, but secondary points could address possible changes to states of vehicle 100 or 120. These secondary points may need recalculation, but if one is triggered and both vehicles 100 and 120 confirm that they can use the secondary point, then no recalculation is needed and both can proceed. For example, one secondary point may be if vehicle 100 falls below a reachability threshold on a maximum power mode—e.g., if the present 100+% of power needed falls below 100%, meaning that AV travel is not possible without assistance if the vehicle is to reach the recharging. This does not mean that the vehicle has to stop, assistance may result in a 10% gain in power (due to process offload) and so the vehicle 100 could presumably travel some distance (e.g., down to 95%) prior to waiting. If the cutoff is 95%, that could get the vehicle 100 very close to the original rendezvous in any event, because the number is determined against distance remaining, and so the 100% value diminishes as the vehicle 100 keeps traveling. That is, this is not suggesting that the vehicle necessarily only travels 5% of the remaining distance, but rather, after traveling 5% of the distance, for example, the vehicle 100 determines whether 95% of the power needed, to travel the remaining 95% of the distance, remains.

In another example, the assist vehicle 120 may itself be experiencing a low power state, and may require the other vehicle 100 to travel further before rendezvous. It is not necessary to send secondary states and conditions, but it may save time and future negotiation between vehicles 100 and 120 if they have secondary conditions that trigger under certain circumstances and the scheduler may receive a message from one that a condition was triggered and confirm with the other that the secondary point corresponding to that condition can be reached without further assistance (rerouting or redetermination) from the backend.

Figure 4:
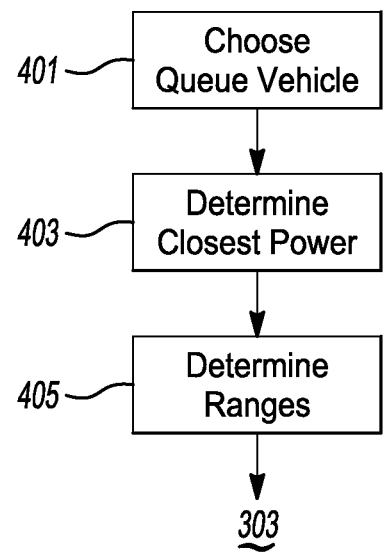
FIG. 4 shows an illustrative assist-queue handling process.

FIG. 4 shows an illustrative assist-queue handling process. If no assist vehicle 120 is available for a given request, the requesting vehicle 100 may be instructed to park and wait until an assist vehicle 120 can be routed. Whether the request vehicle 100 continues to move or not may be a function of its own power, but at that moment in time it may have no assurances of assistance, so it may self-determine the appropriate next-course of action.

Meanwhile, the server may be continually or periodically checking a queue of requests for help, such as when a vehicle 120 identifies as having completed a task. The queue may be organized in any manner, but one example would include having each queue element have a queue-time (when it queued) and a location (where it was presently located) and then based on some combination of this and/or other information, a newly freed vehicle 120 may be correlated to a queued vehicle.

The server may also check if the queue of requests from multiple vehicles 100 have common road segments (or with possible adjustment). If yes, a single assist vehicle 120 may be able to guide these vehicles 100 together for the common road segments.

The determination may also include, for example, closet power locations to a presently queued vehicle 100 location at 403 (which can be tracked along with the vehicle location) and/or ranges 405 of the queued vehicle based on its present power state under various shut-down and assist conditions (as previously described). The process can then branch to 303 for each queued vehicle or a selected queued vehicle.

For example, a newly freed (task-completed) vehicle 120 may identify as being within 20 miles of 3 queued vehicles 100, with sufficient power to maximally (maximum assistance) guide those vehicles 100 an additional 10-15 miles based on how much power it takes to reach a given one of them. Characteristics of the 3 vehicles 100 (e.g., but not limited to, occupant-present, duration of queue, power remaining, proximity to vehicle 120, etc.) may be examined. Further, relative position of those vehicles 100 may be used, if the vehicle 120 can most easily assist one and then a next-one in some reasonable order, assuming no other assist vehicles 120 can be found. Other factors may also be contemplated as reasonable, so that vehicles 100 requesting assistance, for which no immediate assistance exists, can still be helped in a reasonably timely manner as resources permit.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to:
receive a request for travel assistance from a first autonomous vehicle, indicating a low power state of the first autonomous vehicle;
determine a recharging point for use by the first autonomous vehicle;
determine power required for the first autonomous vehicle to reach the recharging point, under one or more power preservation states enactable by the first autonomous vehicle, wherein the power preservation states include disabling sensors that are predefined as non-critical to autonomous driving, allowing autonomous driving to continue, and wherein the manner includes the second autonomous vehicle providing data from sensors comparable to the disabled sensors;
for at least one of the power preservation states, determine a second autonomous vehicle that can provide assistance to the first autonomous vehicle in a manner predefined for the at least one power preservation state and that allows the first autonomous vehicle to reach the recharging point; and
instruct the second autonomous vehicle to rendezvous with the first autonomous vehicle at a determined rendezvous point.

2. The system of claim 1, wherein the recharging point is identified as part of the request.

3. The system of claim 1, wherein the recharging point is determined based at least in part on whether the first autonomous vehicle has an occupant.

4. The system of claim 1, wherein the power preservation states include disabling sensors that are critical to autonomous driving, preventing autonomous driving without assistance from the second autonomous vehicle, and wherein the manner includes the second autonomous vehicle providing data from sensors comparable to the disabled sensors.

5. The system of claim 1, wherein the power preservation states include sharing computing cycles with the second autonomous vehicle that includes at least having the second autonomous vehicle perform one or more computationally intensive tasks predicted to consume power, during computation, above a threshold.

6. The system of claim 1, wherein the determination of the second autonomous vehicle that can provide assistance is based at least on capabilities of the second autonomous vehicle.

7. The system of claim 1, wherein the determination of the second autonomous vehicle that can provide assistance is based at least on location of the second autonomous vehicle.

8. The system of claim 1, wherein the determination of the second autonomous vehicle that can provide assistance is based at least on power state of the second autonomous vehicle.

9. The system of claim 1, wherein the processor is further configured to instruct the first autonomous vehicle to rendezvous with the second autonomous vehicle at the determined rendezvous point responsive to receiving confirmation from the second autonomous vehicle that the second autonomous vehicle can provide assistance.

10. A first autonomous vehicle comprising:
a processor configured to:
determine that a present power level is less than a projected power level needed to reach a recharging point;
request assistance from a remote server;
responsive to the request, receive rendezvous instructions, including a rendezvous point for a second autonomous vehicle;
execute travel to the rendezvous point;
communicate directly with the second autonomous vehicle when both the first and second autonomous vehicle are within communicable range of each other;
offload at least one of computing or sensing tasks to the second autonomous vehicle, wherein the second autonomous vehicle provides a response to the offloaded task allowing the first autonomous vehicle to continue autonomous travel utilizing the response; and
continue to:
offload at least one of computing or sensing tasks to the second autonomous vehicle;
receive responses to the offloaded tasks; and
autonomously travel utilizing the responses, until the first autonomous vehicle reaches at least one of the recharging point or a location proximate to the recharging point where the first autonomous vehicle projects that the present power level is more than the projected power level needed to reach the recharging point.

11. The vehicle of claim 10, wherein the projected power level includes travel with disabled sensors that are non-critical to autonomous driving, allowing autonomous driving to continue.

12. The vehicle of claim 10, wherein the projected power level includes a predefined buffer in addition to an actual amount of power projected to be needed for the vehicle to reach the recharging point.

13. The vehicle of claim 10, wherein the rendezvous point includes the present location of the first autonomous vehicle.

14. The vehicle of claim 10, wherein the processor is configured to park the first vehicle and wait, responsive to notification from the server that no second autonomous vehicle is presently available to assist the first vehicle.

15. A method comprising:
determining, onboard a first autonomous vehicle, that the first autonomous vehicle has an amount of power remaining projected to be needed to reach a recharging point by traveling with one or more predefined systems disabled that still permits autonomous travel;
disabling the predefined systems and traveling towards the recharging point;
determining, subsequent to the disabling, that the first autonomous vehicle no longer has the amount of power remaining projected to be needed to reach the recharging point, re-projected from a present location of the first autonomous vehicle;
responsive to the first autonomous vehicle no longer having the amount of power remaining, communicating with a server and requesting assistance;
responsive to the requesting, receiving rendezvous instructions including a rendezvous location for meeting a second autonomous vehicle; and
responsive to the first and second autonomous vehicles being within communication range, leveraging at the first autonomous vehicle, a capability of the second autonomous vehicle, allowing the first vehicle to reach the recharging point via the leveraging.

16. The method of claim 15, wherein the capability includes sensing capability and wherein the leveraging includes sending at least one sensor data request from the first autonomous vehicle to the second autonomous vehicle and receiving a response at the first vehicle, allowing the first vehicle to continue autonomous driving based on the response.

17. The method of claim 15, wherein the capability includes computing capability and wherein the leveraging includes sending at least one computing request from the first autonomous vehicle to the second autonomous vehicle and receiving a response at the first vehicle, allowing the first vehicle to continue autonomous driving based on the response.

18. The method of claim 15, wherein the capability includes travel capability and wherein the leveraging includes following the second autonomous vehicle using sensing capability of the first autonomous vehicle capable of tracking movement of the second autonomous vehicle.

19. The method of claim 15, wherein the capability includes travel capability and wherein the leveraging includes following the second autonomous vehicle using communication capability of the first autonomous vehicle to communicate with the second autonomous vehicle and to follow the second autonomous vehicle based on receipt of at least one of intended actions of the second autonomous vehicle or driving instructions for the first autonomous vehicle received from the second autonomous vehicle.

* * * * *